Jan. 21, 1936.   H. W. LARSON   2,028,225
WELDING APPARATUS
Filed May 16, 1934

INVENTOR
*H. W. LARSON*
BY *H. R. Whitehorn*
ATTORNEY

Patented Jan. 21, 1936

2,028,225

UNITED STATES PATENT OFFICE 2,028,225

WELDING APPARATUS

Homer W. Larson, Downers Grove, Ill., assignor to Western Electric Company, Incorporated, New York, N. Y., a corporation of New York Application May 16, 1934, Serial No. 725,863

10 Claims. (Cl. 219—4)

This invention relates to welding apparatus, and more particularly to an apparatus for welding in succession continuously advancing work.

An object of the invention is to provide a simple, practical, and efficient apparatus for welding continuously advancing work.

In accordance with the object, one embodiment of this invention comprises a continuously rotating carrier having means cooperating therewith for holding the work associated therewith, for welding, in equally spaced relation and in a predetermined position relative to the carrier. In the continuous movement of the carrier the holding means are automatically actuated to grip the work before the welding operation and thereafter are actuated to release the work for removal and reloading. Mounted for oscillatory movement about the axis of the carrier is an electrical welding device which includes a transformer and electrodes. In timed relation to the continuous rotary movement of the carrier the oscillatable welding device is caused to travel with the carrier while a weld is being made and thereafter it is moved in a direction reverse to that of the continuously moving carrier to bring it adjacent to the next succeeding joint.

Figure 1:
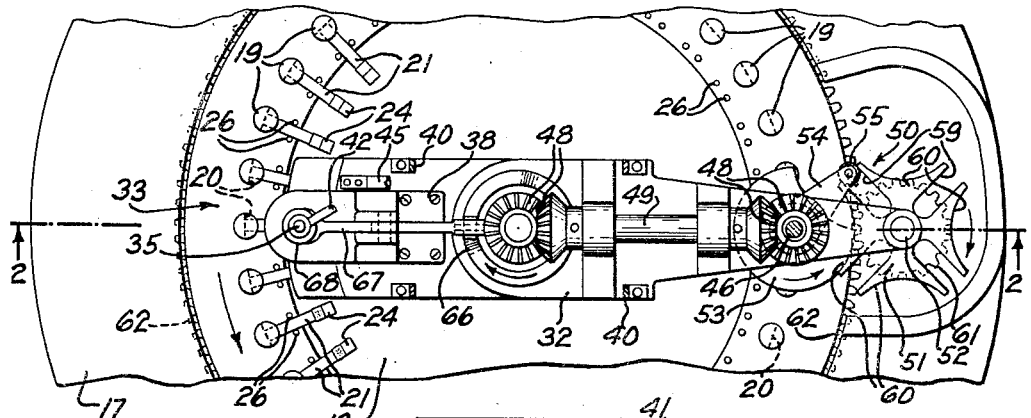
Figure 2:
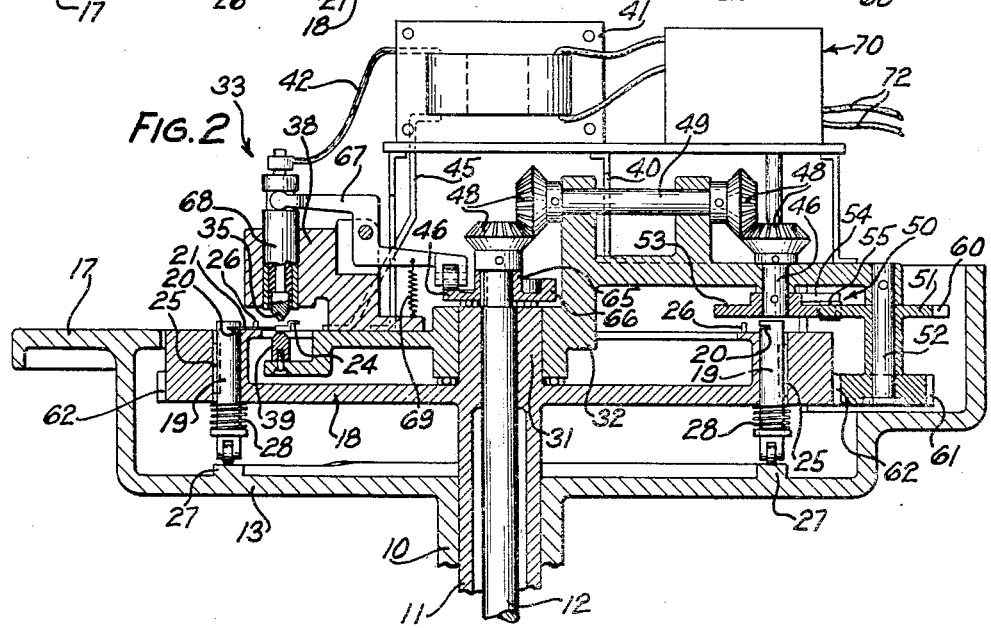

Other features and advantages of this invention will more fully appear from the following detailed description taken in connection with the accompanying drawing, wherein Fig. 1 is a fragmentary plan view of a welding apparatus embodying the features of the invention, and Fig. 2 is a fragmentary vertical section taken on the line 2—2 of Fig. 1.

Referring now to the drawing in detail, a stationary circular hollow pedestal 10, shown fragmentarily, has journaled therein a hollow rotatable spindle 11 through which extends a rotatable shaft 12. The lower ends of the spindle 11 and the shaft 12 are connected to suitable driving mechanism, not shown, which in the operation of the welding apparatus, wherein in the present embodiment the apparatus is provided with thirty-two work holding positions, drives the spindle and the shaft continuously at 1 R. P. M. and 32 R. P. M. and in counterclockwise and clockwise directions, respectively, as indicated by the arrows (Figs. 1 and 2). The driving mechanism for the spindle 11 and the shaft 12 has been omitted from the disclosure, since it forms no part of the invention and is not necessary to a complete understanding thereof. Integral with the pedestal 10 at its upper end is a generally circular housing 13 which terminates at its upper extremity with a horizontal annular-shaped table 17, the height of the upper surface thereof from the floor being such that it is convenient for attending operators.

The upper end of the spindle 11 is formed with a circular hollow turret or head 18, its upper peripheral edge lying adjacent the inner periphery of the annular-shaped table 17 and in the plane of the upper surface thereof. Reciprocably carried in vertical apertures in the head 18 are a plurality of equally spaced circularly arranged spring pressed work holding members 19 which project at opposite ends from the head. The upper end of each of the members 19 is provided with a horizontal pocket or slot 20 for the reception of the outer end of a rectangular-shaped resilient part, indicated at 21, to the free end of which upon its upper surface is welded a channel-shaped offset part, indicated at 24. The members 19 are prevented from rotating about their own axes in the head 18 in order that the slots 20 thereof will at all times be arranged in a predetermined position in the head 18, for receiving the parts 21, by keys 25 which permit the members to move longitudinally in the head but prevent them from rotating thereon. Associated with each work holding member 19 is a pair of spaced vertical pins 26 which are secured to the head 18 adjacent the inner peripheral edge thereof. The pins 26 in cooperation with the members 19 retain the parts 21 and 24 in a predetermined radially extending position on the rotary head 18, the outer end of the part 21 being entered in the slot 20 of the member 19, while the opposite vertical edges of the part are engaged between the pins 26.

Carried by the members 19 at their lower ends are rollers which during a predetermined period in the rotation of the head 18 engage an annular cam face 27 integral with the horizontal inner surface of the stationary housing 13. During one period in the rotation of the head 18, after the parts 21 have been positioned in the slots 20 of the members 19 and between the pins 26, the cam face 27 recedes from the rollers and compression springs 28 surrounding the members 19 and having their opposite ends engaging the lower surface of the head 18 and an annular surface on the members act to move the members downwardly and clamp the parts 21 against the upper surface of the head 18. During another period in the rotation of the head 18, occurring after the welding operation, to be referred to hereinafter, the rollers carried by the members 19 ride onto the cam face 27 and move the work holding members upwardly against the action of the associated springs 28, thus releasing the welded parts 21 and 24 for removal and reloading.

The shaft 12 is rotatably journaled at its upper end in a bearing sleeve 31 formed integral with the head 18. Rotatably journaled upon the outer peripheral surface of the bearing sleeve 31 is an irregular shaped casting 32 which supports an electrical welding device indicated in general at 33 (Fig. 2). An antifriction ball bearing interposed between the casting 32 and the head 18 serves to support the welding device 33 upon the rotary head 18. An upper vertically movable electrode 35 is reciprocably carried in and electrically insulated from a bracket 38 fixed to the casting 32. Alined with the upper electrode 35 is a lower fixed electrode 39 which is carried upon an extended bracket portion of the casting 32. Mounted upon a framework 40 fixed to the casting 32 and in vertical alinement with the rotary head 18 is a transformer 41 of any suitable construction (Fig. 2), one terminal of the secondary winding thereof being connected through a flat strip flexible lead 42 to the movable electrode 35, and the other terminal being connected to the fixed electrode 39 through the casting 32 by a conductor bar 45.

The welding device 33 in the operation of the apparatus is continuously oscillated forward and backward upon the continuously rotating bearing sleeve 31 of the head 18, the device first traveling with respect to the head in the direction of rotation thereof a distance nearly equal to the space between successive work holding positions, during which movement the welding of the parts 21 and 24 occur and then the device immediately moves backward a similar distance for welding the succeeding parts. The electrodes 35 and 39 which travel with the device 33 are caused to contact the parts 24 and 21, respectively, an instant after the device begins its forward oscillatory movement and remain in contact therewith for a suitable period to complete the weld. Following the welding operation the electrodes are disengaged from the parts and the welding device 33 continues on until it terminates its forward movement, and thereupon the backward movement of the welding device 33 takes place. Means for effecting the above described oscillatory movements of the welding device 33 with the electrodes 35 and 39 along with the vertical reciprocation of the movable electrode 35 to engage and disengage the electrodes with the successive parts 24 and 21, respectively, and in timed relation to their continuous advance movement comprises the Geneva gear and associated mechanism described in the next paragraph.

Rotatably journaled in the casting 32 is a vertical shaft 46 which is continuously rotated at the same speed but in a counterclockwise or reverse direction to that of the continuously rotating shaft 12 by a train of bevel gears 48 fixed to the upper ends of the shafts 12 and 46 and to opposite ends of a horizontal shaft 49 rotatably journaled in the casting. The shaft 46 is the driving shaft of a Geneva motion mechanism indicated in general at 50 which effects successive intermittent clockwise rotary movements, as indicated by the arrow Fig. 1, to a star wheel 51 freely rotatable on a stud shaft 52, secured to the casting 32, in the following manner: To the lower end of the continuously rotating shaft 46 is secured a crank sector 53 carrying a crank 54 with a roller 55 at its outer end. The star wheel 51 on the shaft 52 is in alinement with the crank sector 53 and has four radial slots or recesses 59 in its periphery to be engaged by the driving roller 55. Intermediate the radial slots 59 the periphery of the star wheel 51 has concave recesses or depressions 60, the curvature of which corresponds to the curvature of the outer periphery of the crank sector 53.

In the operation of the Geneva motion mechanism shown in the drawing and above described the continuous rotation of the shaft 46, driven from the shaft 12, and carrying the crank sector 53, causes the driving roller 55, carried by the crank 54, to be continuously revolved about the axis of the shaft 46. During each rotation of the shaft 46, or each revolution of the roller 55, the roller enters one of the slots 59 in the star wheel 51, correctly positioned to receive it from the preceding engagement of the roller in the advanced slot, and communicates a 90° rotation to the star wheel, and then there is a dwell of the star wheel until the roller enters the next slot thereof. The sector 53 is cut away at a position to permit the projections on the star wheel to pass within the periphery of the circle of the sector at the proper time.

As the roller 55 passes out of the slot 59 the following concave depression 60 engages with the periphery of the crank sector 53, which prevents the star wheel 51 from rotating farther about its own axis and locks it in position until the roller 55 enters the next slot thereof. Integral with the star wheel 51 at the lower end of the stud shaft 52 is a gear pinion 61 which meshes with a gear 62 formed upon the periphery of the head 18. From the above description it will be evident that whenever the star wheel 51 is locked from rotation about its own axis the gear pinion 61 is also locked to the gear 62 of the continuously traveling head 18 and consequently will travel therewith and carry with it the entire welding device 33, at which time no relative rotary movement between the casting 32 journaled on the bearing sleeve 31 of the head 18 occurs, the head and the welding device traveling together in a counterclockwise direction. It will also be evident that whenever the star wheel 51, which is given a 90° rotation by means of the driving roller 55, which is revolving in a counterclockwise direction, entering one of the slots 59, the gear pinion 61 will be rotated in a clockwise direction and thereby will roll upon the gear 62 of the head 18 in a direction reverse to and during the continuous counterclockwise rotation thereof, and thus carry with it the welding device 33.

Keyed to the upper end of the continuously rotating shaft 12 is a sleeve 65 having an annular cam face 66, an anti-friction ball bearing being arranged between the opposed surfaces of the cam sleeve and the bearing sleeve 31 of the continuously rotating head 18. Pivoted to the bracket 38 supporting the movable electrode 35 is a lever 67 carrying a roller at its lower inner end which rides upon the cam face 66. The upper outer end of the lever 67 is bifurcated, the furcations thereof being operatively engaged in an annular channel formed in a supporting sleeve 68, carrying the electrode 35, reciprocably carried in the bracket 38. A tension spring 69 attached at opposite ends to the lever 67 and the bracket 38 constantly maintains the roller of the lever in engagement with the cam face 66. The cam face 66 is so shaped that during each complete rotation thereof the roller will be riding on the raised portion of the cam for approximately three quarters of its rotation, thereby holding the electrode 35, which is operatively connected to the lever 67, in contact with the part 24. It is during this period that the welding of the parts 21 and 24 occur. During the remaining period in each rotation of the cam face 66 the roller will be riding on the lower portion of the cam face and consequently the electrode 35 will be in its raised position, as shown in Fig. 2, disengaged from the part 24. The electrode 35 in moving downwardly contacts with the part 24 upon the resilient part and then flexes the part 21 sufficiently to contact its lower surface with the stationary electrode 39 arranged thereunder.

Any usual or suitable mechanism, such as a cam actuated switch, indicated in general at 70, carried upon the framework 40, and driven from the continuously rotating shaft 46 may be employed for controlling the timing of the current supply, through flexible primary leads 72, to the primary winding of the transformer 41, in order that the current to the electrodes 35 and 39 may be cut on or off at the correct intervals during operation, the primary circuit being closed immediately after the electrodes have contacted with the parts 21 and 24 and cut off at the termination of the welding period. The details of the switch 70 for controlling periodically the welding current has been omitted from the disclosure, since it forms no part of the invention and is not necessary to a complete understanding thereof.

Due to the fact that the transformer 41 oscillates with the welding apparatus 33 the heavy secondary leads do not have to be flexed except for the slight vertical flexing of the lead 42 connected to the movable electrode. The primary leads 72 carry a much smaller current than the secondary leads and are of small cross-section so that they can be flexed many times without wearing out. These leads can, of course, be made as long as desired.

It is believed from the foregoing description of the apparatus that the manner of its operation will be clearly apparent. However, a brief general description will be given.

It will be assumed that the spindle 11 and the shaft 12 are being driven continuously, for example, in the present embodiment, wherein the work carrying turret or head 18 is provided with thirty-two work holding members 19, at 1 R. P. M. and 32 R. P. M. and in counterclockwise and clockwise directions, respectively. Also, it will be assumed that the cam faces 27 and 66 have been formed and arranged relative to each other and to the speed of rotation of the head 18 and that of the cam face 66, which is rotated by the shaft 12, to time correctly the periodic gripping and releasing of the work by the work holding members 19, effected by the cam face 27, and the contacting and disengagement of the movable electrode 35 with the part 24 to be welded to the part 21, effected by the cam face 66.

During the continuous counterclockwise rotation of the turret or head 18 one attendant positioned at the upper side of the apparatus, as viewed in Fig. 1, associates assembled parts 21 and 24 in the manner previously described with the slots 20 of the successive work holding members 19 and the pair of spaced pins 26 associated with each member, as they pass by, the members 19 during this period being in their upper position, as shown at the right side of Fig. 2, for receiving the part 21, due to the rollers at their lower ends riding against the annular cam face 27. Shortly thereafter in the continuous movement of the head 18 and before the parts 21 and 24 have moved between and are alined with the electrodes 35 and 39, the cam face 27 recedes from the rollers and the compression springs 28 act to move the members downwardly and clamp the parts 21 against the upper surface of the head.

The welding device 33, in the position shown in the drawing, has just terminated its return movement after advancing with the head 18 and has been locked to the rotating head, as shown by the position of the elements of the Geneva motion mechanism 50 in the manner previously described, and is again advancing with the head. Immediately the welding device 33 begins to travel forward with the alined work, carried in the head 18, the raised portion of the continuously rotating cam face 66 engages the roller on the lever 67 and actuates the lever to move the electrode 35 downwardly and in the manner previously described the electrodes 35 and 39 are contacted with the parts 24 and 21, respectively, the secondary winding of the transformer 41 being excited immediately thereafter through the closing of the primary winding by the cam actuated switch 70, and the welding of the parts 21 and 24 begins. The welding current across the electrodes 35 and 39 continues for a suitable period and is then cut off by the switch, while the device 33 advances with the head 18 a distance equal to approximately three quarters of the space between successive working holding members 19, the electrodes in the meantime being disengaged from the welded parts by the roller of the lever 67 riding onto the lower portion of the rotating cam face 66, thereby permitting the spring to act upon the lever to raise the electrode 35 from the part 24.

At this instant the continuously revolving roller 55 of the Geneva motion mechanism enters one of the slots 59 of the star wheel 51, which at this time is unlocked from the crank sector 53, and turns the star wheel 90° in a clockwise direction. The gear pinion 61 integral with the star wheel 51 will consequently roll upon the gear 62 of the continuously advancing head 18 in a direction reverse to the direction of advance of the head and the work carried thereon and will carry with it the welding device 33 to aline with the succeeding parts. When the continuously revolving roller 55 reaches the position shown in the drawing, one complete oscillatory movement of the welding device is terminated and thereafter the cycle begins again. In the continued rotary movement of the head 18 after the parts 21 and 24 have been welded, as just described, the rollers carried by the work holding members 19 ride onto the annular cam face 27 and move the members upwardly against the action of the compression springs 28, the welded parts thus being released. At a point along the lower side of the apparatus, as viewed in Fig. 1, the released welded parts 21 and 24 may be automatically removed from the apparatus or by an attendant.

Advantages of the herein described apparatus are that it is continuous in operation, provides for a rapid production of uniform welds, and functions in an efficient manner with a minimum of manual labor.

Although the invention has been disclosed and described as applied to an apparatus for welding particularly shaped parts, it is clear that it may have a more general application and that modifications can be made without departing from the spirit and scope of the appended claims.

What is claimed is:

1. In an apparatus for welding, means for continuously advancing work pieces along a predetermined path, means carried by said work piece advancing means for holding the work pieces thereon, and a device for welding successive work pieces while being advanced, said device having a to and fro movement along said path.

2. In an apparatus for welding parts, means for continuously advancing spaced parts along an endless path, means carried by said part advancing means for holding the parts in spaced relation thereon, and a device for welding successive parts while being advanced, said device having an oscillatory movement along said path.

3. In an apparatus for welding parts, means for continuously advancing spaced parts along a predetermined path, means carried by said part advancing means for holding the parts in spaced relation thereon, a movable welding device including a transformer for welding parts successively while advancing, means for supporting said device for movement along said path, and means for moving said device including the transformer forward and backward in timed relation to the continuously advancing parts for welding succeeding parts.

4. In an apparatus for welding parts, a continuously movable carrier, means for moving said carrier, means carried by the carrier for holding parts in a predetermined position relative to and on said carrier, a device having forward and backward movements in a direction parallel to the movement of said carrier for welding successive parts while being moved, and means for moving said device forward and backward in timed relation to the continuous movement of said carrier.

5. In an apparatus for welding parts, a carrier for continuously advancing equally spaced parts mounted thereon along a circular path, a welding device mounted for oscillatory movement adjacent and about the axis of said carrier, and means for periodically actuating said device in timed relation with the movement of said carrier to advance therewith for a predetermined period to weld the same and then move backward for welding the succeeding parts.

6. In an apparatus for welding parts, a continuously movable carrier, means for moving said carrier, a plurality of members movably mounted in said carrier and cooperating therewith to hold parts in a predetermined position relative to said carrier, means for periodically actuating said members responsive to the movement of said carrier for holding and releasing the parts, a device having forward and backward movements in a direction parallel to the movement of said carrier for welding successive parts while being moved, and means for moving said device forward and backward in timed relation to the continuous movement of said carrier.

7. In an apparatus for welding parts, a continuously movable carrier, means for moving said carrier, means on said carrier for holding successive parts in a predetermined position relative to said carrier, welding mechanism including electrodes for contacting with the parts, said mechanism mounted for movement adjacent said carrier, and means for moving said mechanism and for contacting the electrodes with the parts for a predetermined period in timed relation to the continuous movement of said carrier, and thereafter disengaging the electrodes from the parts and moving said mechanism in a direction reverse to that of the continuously moving parts for contacting the electrodes with the succeeding parts.

8. In an apparatus for welding parts, a continuously rotating carrier, means for driving said carrier, means on said carrier for holding successive parts in a predetermined position relative to said carrier, welding mechanism including electrodes for contacting with the parts, said mechanism mounted for oscillatory movement about said carrier, and means for moving said mechanism and for contacting the electrodes with the parts for a predetermined period in timed relation to the continuous rotary movement of said carrier, and thereafter disengaging the electrodes from the parts and moving said mechanism in a direction reverse to that of the continuously moving parts for contacting the electrodes with the succeeding parts.

9. In an apparatus for welding parts, a continuously rotating carrier, means for driving said carrier, means on said carrier for holding successive parts in a predetermined position relative to said carrier, welding mechanism including electrodes for contacting with the parts, said mechanism mounted within and oscillatable about the axis of said carrier, and means for moving said mechanism and for contacting the electrodes with the parts for a predetermined period in timed relation to the continuous rotary movement of said carrier, and thereafter disengaging the electrodes from the parts and moving said mechanism in a direction reverse to that of the continuously moving parts for contacting the electrodes with the succeeding parts.

10. In an apparatus for welding parts, a continuously movable carrier, means for moving said carrier, a plurality of members movably mounted in said carrier and cooperating therewith to hold parts in a predetermined position relative to said carrier, means for periodically actuating said members responsive to the movement of said carrier for holding and releasing the parts, welding mechanism including electrodes for contacting with the parts, one of the electrodes being movable relative to the other, said mechanism mounted for movement adjacent said carrier, and means for moving said mechanism and for actuating said movable electrode to contact the electrodes with the parts for a predetermined period in timed relation to the continuous movement of said carrier, and thereafter actuating said movable electrode to disengage the electrodes from the parts and moving said mechanism in a direction reverse to that of the continuously moving parts for contacting the electrodes with the succeeding parts.

HOMER W. LARSON.